No. 630,300. Patented Aug. 1, 1899.
J. F. MOORE.
RIDING HARROW.
(Application filed Jan. 6, 1899.)
(No Model.) 2 Sheets—Sheet 1.
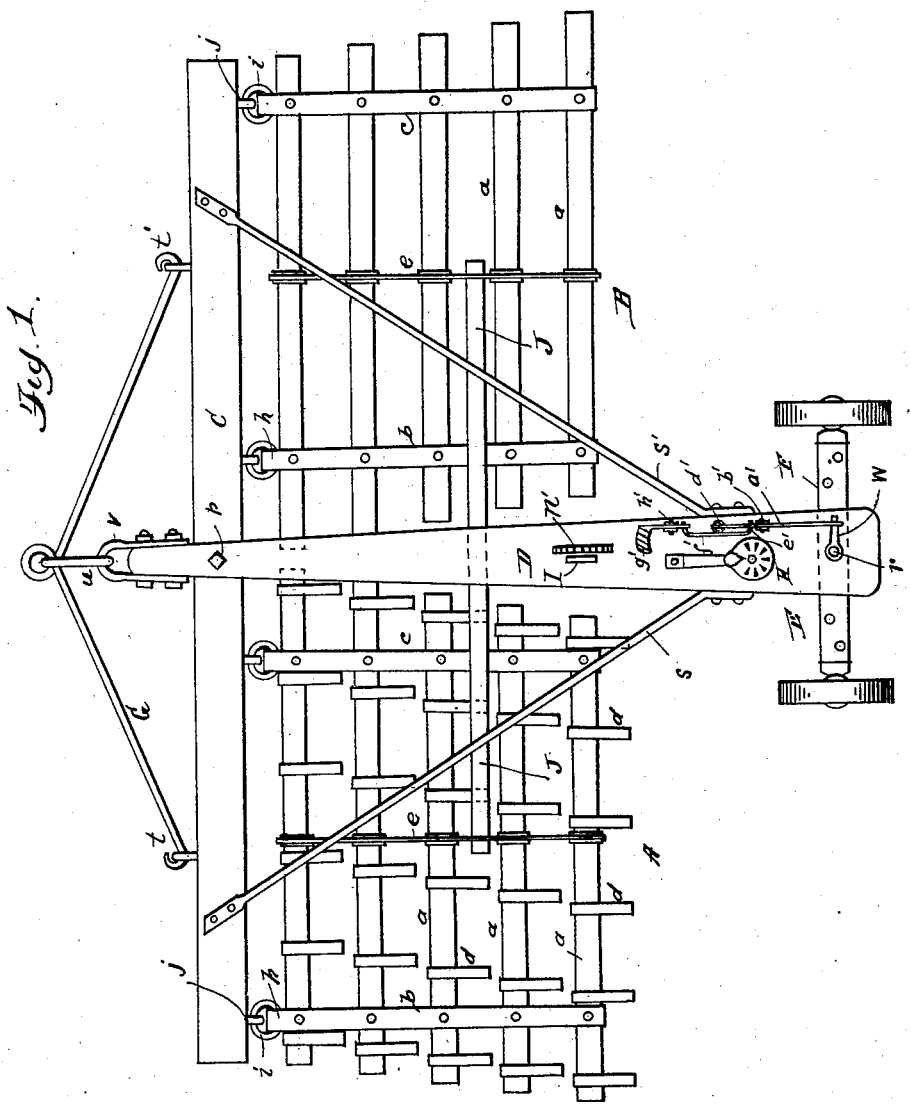

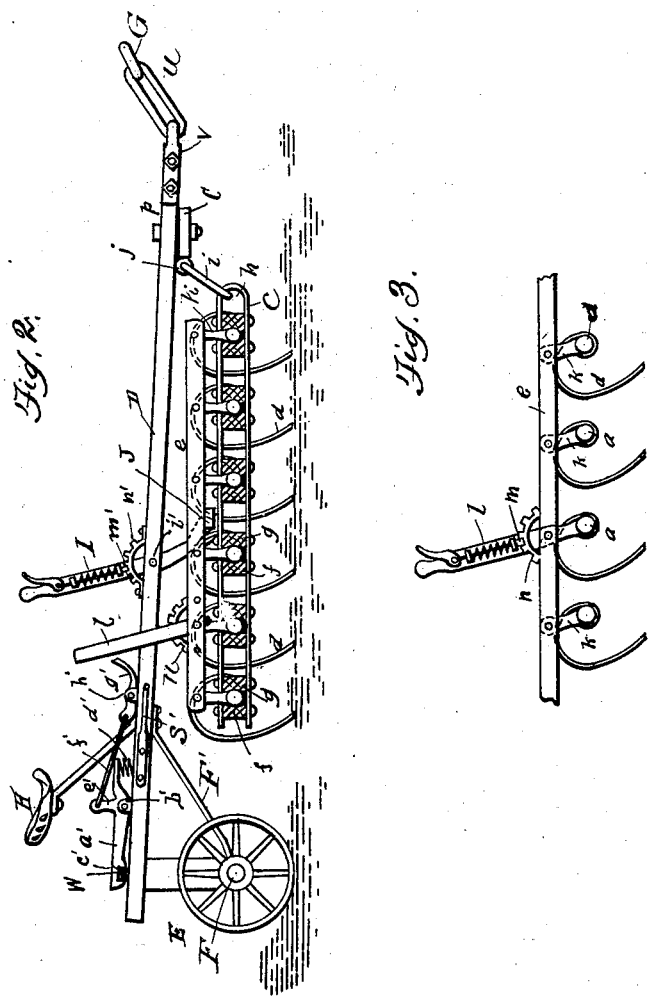

UNITED STATES PATENT OFFICE.

JAMES F. MOORE, OF FAIRLAND, INDIAN TERRITORY.

RIDING-HARROW.

SPECIFICATION forming part of Letters Patent No. 630,300, dated August 1, 1899.

Application filed January 6, 1899. Serial No. 701,391. (No model.)

*To all whom it may concern:*

Be it known that I, JAMES F. MOORE, a citizen of the United States, residing at Fairland, in the Cherokee Nation, Indian Territory, have invented certain new and useful Improvements in Riding-Harrows; and I do hereby declare the following to be a full, clear, and exact description of the invention, such as will enable others skilled in the art to which it appertains to make and use the same, reference being had to the accompanying drawings, forming a part of this specification.

This invention relates to improvements in harrows, and especially that class commonly known as "riding-harrows."

It has for its object to provide an economical and durable construction that can be readily adjusted to change the angle of the teeth and also to provide means for raising and lowering the harrow as desired to increase or decrease its depth.

A further object of this invention is to furnish a simple attachment upon which the operator may ride, with means for controlling the angle of the carrying-wheels to permit the harrow to be turned freely.

The invention consists in the general construction and arrangement of the various parts to be hereinafter described and claimed.

Referring to the accompanying drawings, Figure 1 is a plan view of my improved invention. Fig. 2 is a side elevation of the same, and Fig. 3 is a detail view showing the spring-tooth bars and the means by which the angles of the teeth are controlled.

Like letters of reference refer to corresponding parts throughout the figures.

A and B represent the two wings of the harrow, each of which is composed of the tooth-bars $a\ a$, the members $b\ c$, spring-teeth $d$, controlling-bar $e$, and its attachments. The tooth-bars $a$ are preferably composed of tubing, upon which the teeth are suitably clamped, and they are journaled in the members $b\ c$, as shown in Fig. 2, which consists of providing the blocks $f\ g$ upon two sides of the tubular bars, where they are secured by suitable bolts which pass through the metal strap forming the members $b\ c$. The forward ends of the members $b\ c$ form loops at $h$, through which the links or rings $i$ are engaged, and with these rings the staples $j$ engage, which are fastened to the draw-bar C. The angle of the teeth is controlled by means of the bar $e$, which is pivotally connected to the short arms $k$, secured to and rising from the said bars, and one of these arms is carried up to form the lever $l$, by means of which the operator swings the controlling-bar $e$ longitudinally, thus causing the tubular bars to rotate in their bearings to shift the angle of the teeth. The dog $m$ and toothed segment $n$ are secured to the controlling bar and lever for the purpose of holding the tubular bars and teeth in their adjusted position.

The riding attachment consists of the frame D and the truck E. The frame is bolted at $p$ to the draw-bar C and extends backward a sufficient distance behind the harrow, where the axle F of the truck is engaged by means of the king-bolt $r$.

$s$ and $s'$ are braces extending from the draw-bar to the rear portion of the frame in order that the truck may be guided in its proper position behind the harrow, and from the draw-bar extending forward I provide the connecting-rod G, which is secured to the draw-bar at its ends $t\ t'$ and at the center to the end of the frame D by means of the link $u$ and clevis $v$.

It will be apparent that owing to the position occupied by the truck E the wheels and axle will of necessity have to be turned upon the king-bolt in the operation of turning the harrow; otherwise either the harrow or truck would draw sidewise, causing a destructive strain upon the parts and rendering the operation difficult. This result is accomplished by mounting the frame D upon the truck in the usual manner with a king-bolt $r$, so that the wheels may turn freely therearound.

To prevent the turning and jerking motion that would be caused by the operation of the truck over rough ground, at the same time enabling the operator to immediately release the said truck when turning the harrow, I secure at the upper end of the king-bolt (which is fastened rigidly to the axle of the truck) the short lever W, extending longitudinally with said axle, and reaching forward at right angles to the lever is a second lever $a'$, pivoted to a suitable block $b'$, secured upon the frame. This latter lever is furnished with a notch $c'$ to engage over the end of the short lever W, so that when it is resting thereover the lever and truck are held from turning upon the king-bolt. At the front end of the holding-lever $a'$ is a spring $d'$, engaging between it and the frame, so that the outer notched end is normally held in the path of the short lever W. The short extension $e'$, formed integral with the lever $a'$, rises above the pivotal point $b'$ and furnishes means to which the operating-rod $f'$ is secured, which leads forward and connects with the foot-piece $g'$. This foot-piece is pivoted at $h'$ to a suitable lug secured to the frame, so that the operator who sits in the seat H may actuate the foot-lever to release the truck when it is desired to turn the harrow.

I represents a lever extending through the frame, in which it is pivoted at $i'$. The lower end of this lever extends downward and forward, where it engages the cross-bar J, reaching from one of said operating-bars to the other upon the wings of the harrow, and the upper end terminates in a suitable handle portion for the convenience of the operator. The usual dog $m'$ and toothed segment $n'$ are secured to the lever and frame for the purpose of holding said lever in its adjusted position. By these means the wings may be raised to cause the teeth to work either deep or shallow, as desired, and also for the purpose of conveying the implement from one place of work to the other.

From the foregoing it will be obvious that some slight modifications may be made in the general construction and arrangement of the various parts as I have herein shown and described them without materially affecting the results, and I desire to have it understood that although I prefer this particular form equivalent means may be employed without departing from the spirit and scope of my invention.

Having thus described my invention, what I claim is—

1. In a riding-harrow, the combination of a frame, a truck secured by means of a king-bolt thereto, a draw-bar secured to said frame, members linked to said draw-bar, tubular bars journaled in said members, teeth secured to said tubular bars, means for controlling the angles of said teeth, and means for securing said truck from turning until so desired by the operator, substantially as described.

2. In a riding-harrow, the combination of a frame, a truck pivoted to said frame, means for securing said truck from turning, means by which the operator may release the same when desired, a draw-bar secured to the forward end of said frame and wing-harrows linked to said draw-bar, substantially as described.

3. In a riding-harrow, the combination of a frame, a truck secured to said frame by means of a king-bolt, said king-bolt being secured to said truck and provided with a lever at its upper end, means for securing said lever in one position whereby said truck is prevented from turning, means for releasing said lever, a draw-bar secured to the forward end of said frame, wing-harrows linked to said draw-bar, and a lever pivoted to said frame, and arranged in connection with said harrows, whereby they may be raised or lowered, substantially as described.

In testimony whereof I affix my signature in presence of two witnesses.

JAMES F. MOORE.

Witnesses:
W. G. LABADIE,
W. B. COOPER.